(12) United States Patent
Li (10) Patent No.: US 9,004,703 B2
(45) Date of Patent: Apr. 14, 2015

(54) METHOD FOR GENERATING DIFFUSE REFLECTION LIGHT AND DEVICE THEREOF

(76) Inventor: Bing Li, Shenzhen (CN)

( * ) Notice: Subject to any disclaimer, the term of this patent is extended or adjusted under 35 U.S.C. 154(b) by 179 days.

(21) Appl. No.: 13/580,286

(22) PCT Filed: Sep. 28, 2010

(86) PCT No.: PCT/CN2010/001506
§ 371 (c)(1),
(2), (4) Date: Nov. 16, 2012

(87) PCT Pub. No.: WO2011/124004
PCT Pub. Date: Oct. 13, 2011

(65) Prior Publication Data
US 2013/0194807 A1 Aug. 1, 2013

(30) Foreign Application Priority Data
Apr. 9, 2010 (CN) .................. 2010 2 0160627 U (51) Int. Cl.
*F21V 14/00* (2006.01)
*F21V 14/06* (2006.01)
*F21V 7/16* (2006.01)
(Continued)

(52) U.S. Cl.
CPC ............... *F21V 14/00* (2013.01); *F21V 14/06* (2013.01); *G03B 2215/0525* (2013.01); *G03B 2215/0528* (2013.01); *G03B 2215/0585* (2013.01); *G03B 2215/0582* (2013.01); *F21V 7/16* (2013.01); *F21V 14/04* (2013.01); *F21Y 2101/02* (2013.01); *G03B 15/02* (2013.01); *G03B 2215/0589* (2013.01)

(58) Field of Classification Search
CPC ....... F21V 7/00; F21V 17/02; G03B 15/0442; G03B 15/02; G03B 15/03; G03B 15/0415; G03B 15/0421; G03B 15/0431; G03B 15/05; G03B 17/04; G03B 2215/0528; G03B 2215/0525; G03B 2215/0589; G03B 2215/0592; G03B 2215/0582; G03B 2215/0585; G03B 2215/0564; G03B 2215/0567
USPC ............. 362/3–18, 241–248, 296.01, 311.15; 396/4, 200
See application file for complete search history.

(56) References Cited

U.S. PATENT DOCUMENTS

D91,915 S    4/1934  Wise
D204,302 S   4/1966  Pauli
(Continued)

FOREIGN PATENT DOCUMENTS

CN    201203048 Y    3/2009
CN    201273528 Y    7/2009
(Continued)

*Primary Examiner* — Peggy Neils
*Assistant Examiner* — Zheng Song (57) ABSTRACT

A method for generating diffuse reflection light and a diffuse reflection lamp are provided. The diffuse reflection lamp comprises a reflective plate (10), a connector (20) and a dragging device (40). The reflective plate (10) is removably fixed on the lamp by the connector (20) to reflect the light from the lamp. One end of the dragging device (40) is connected with the reflective plate (10), and the other end is connected with the connector (20); or the dragging device (40) hoops around the outer edge of the reflective plate (10). Therefore, the reflective plate (10) is elastically bended toward and formed into a curved arc surface to collect the diffuse reflection light.

39 Claims, 10 Drawing Sheets

(51) Int. Cl.
*F21V 14/04* (2006.01)
*F21Y 101/02* (2006.01)
*G03B 15/02* (2006.01)

(56) References Cited

U.S. PATENT DOCUMENTS

| | | | |
|---|---|---|---|
| D209,081 S | 10/1967 | Netland | |
| 3,851,164 A * | 11/1974 | Intrator | 362/7 |
| 4,335,422 A * | 6/1982 | Van Ess | 362/388 |
| 4,460,946 A * | 7/1984 | Tinz | 362/319 |
| 4,616,293 A | 10/1986 | Baliozian | |
| 4,757,425 A | 7/1988 | Waltz | |
| D312,471 S | 11/1990 | Couch | |
| 5,023,756 A | 6/1991 | Regester | |
| D329,104 S | 9/1992 | Dieperink | |
| 5,154,503 A | 10/1992 | Sternsher | |
| 5,247,769 A * | 9/1993 | Becker | 52/506.06 |
| 5,311,409 A | 5/1994 | King | |
| D373,132 S | 8/1996 | Baillie-Hamilton et al. | |
| 5,734,934 A * | 3/1998 | Horinishi et al. | 396/62 |
| 5,778,264 A * | 7/1998 | Kean | 396/174 |
| D399,862 S | 10/1998 | Baliozian | |
| 5,839,006 A | 11/1998 | Beckerman | |
| 6,176,598 B1 | 1/2001 | Seligman | |
| 6,411,778 B1 | 6/2002 | Peterson | |
| 6,491,405 B1 * | 12/2002 | Shirilla | 362/16 |
| 6,733,145 B2 * | 5/2004 | Shirilla | 362/16 |
| D501,947 S | 2/2005 | Haugaard et al. | |
| D522,680 S | 6/2006 | Stephant | |
| D527,134 S | 8/2006 | Bagen | |
| D565,229 S | 3/2008 | Haugaard et al. | |
| D570,516 S | 6/2008 | Orellana | |
| 7,416,316 B2 * | 8/2008 | O'Brien et al. | 362/382 |
| D588,292 S | 3/2009 | Sabernig | |
| 7,497,603 B2 * | 3/2009 | Malkanov | 362/355 |
| 7,773,869 B2 | 8/2010 | Zou | |
| 7,810,941 B2 | 10/2010 | Capozzi | |
| 7,978,971 B1 * | 7/2011 | Honl | 396/198 |
| 2003/0048618 A1 * | 3/2003 | Adams et al. | 361/740 |
| 2007/0127145 A1 * | 6/2007 | Reid et al. | 359/857 |
| 2008/0181598 A1 | 7/2008 | Kobre | |
| 2008/0204883 A1 | 8/2008 | Fong | |
| 2009/0257233 A1 * | 10/2009 | Guercio | 362/320 |
| 2010/0177520 A1 * | 7/2010 | Briese | 362/347 |
| 2010/0188752 A1 * | 7/2010 | Briese | 359/599 |
| 2011/0217028 A1 * | 9/2011 | Sowder et al. | 396/4 |

FOREIGN PATENT DOCUMENTS

| | | |
|---|---|---|
| CN | 201416840 Y | 3/2010 |
| JP | 11-96816 | 4/1999 |

* cited by examiner

METHOD FOR GENERATING DIFFUSE REFLECTION LIGHT AND DEVICE THEREOF

PRIORITY CLAIM

This is a U.S. national stage of application No. PCT/CN2010/001506, filed on Sep. 28, 2010. Priority is claimed on the following application: Country: China, Application No.: 201020160627.0, Filed: Apr. 9, 2010, the content of which is/are incorporated here by reference.

BACKGROUND OF THE INVENTION

1. Field of the Invention

The present invention relates to an illumination device, especially to a method and a device for generating diffuse reflection light.

2. Description of the Related Art

Light box, light reflection device, and soft light device are often needed in the process of photographing, and in particular in art photographing where the soft light effect is closely associated with the soft light area of the soft light device. The larger the soft light area is, the better the soft light effect is. The types of the soft light device in the prior art and their disadvantages are as follows:

1. Conventional light box, soft light box, soft light umbrella, and light reflecting umbrella:

The disadvantages include: the installation and the disassembly are quite troublesome; the use in the open air or under the situation of frequent movement is time-consuming and laborious; certain skill is especially required for installation of a soft light box; the entire device is heavy, difficult for handholding and very inconvenient in movement; therefore, conventional devices are suitable for indoor use and use at a fixed position; they are extremely inconvenient when being used in open air.

2. Conventional reflector, soft light device with external top light source:

The disadvantages include: small area of the light reflection and soft light material, and inferior soft light effect. Some portable soft light devices hinder the original function of original light source from effecting during the installation and use thereof.

3. Because the reflector of light box, and soft light and light reflection device in the prior art is fixed when being used and does not lead to area change, the equivalent luminescent area thereof cannot be adjusted.

SUMMARY OF THE INVENTION

The technical problem to be solved by the present invention is to avoid the above deficiencies in the prior art in order to achieve further improvement on the prior art, and provide a method for generating diffuse reflection light, which is characterized by convenient installation and disassembly, superior soft light effect, and adjustable equivalent luminescent area and primary illuminating direction of light, and a diffuse reflection light generating device suitable for frequent movement, which is designed based on the method of the present invention.

The technical proposal adopted in the present invention for solving the technical problem is to provide a method for generating diffuse reflection light, which is based on a luminescent lamp. The method comprises the following steps:

A. detachably fixing a reflector on the luminescent lamp by means of a connector;

B. elastically bending the reflector forwards by means of a pulling device in order to focus the diffuse reflection light, wherein one end of the pulling device is connected or sleeved with the reflector, the other end of the pulling device is connected with the connector, or the pulling device is hooped on the outer edge of the reflector.

In step B, the reflector may elastically be bent forwards in a longitudinal direction or a transverse direction by means of the pulling device, in order to obtain the diffuse reflection light.

The reflector may be a solid plate, the surface of which is rugged and granulated and also covered by light reflecting material.

The backside of the reflector may be provided with reinforcing plates and/or reinforcing bars.

As an improvement, the reflector is a hollowed-out plate, and its surface is adhered with a light reflecting thin film. Reinforcing bars and/or reinforcing plates are arranged at the unhallowed-out part of the reflector.

The reflector may be foldable, with every two folding parts of blades thereof being linked with each other through a hinge or a flexible foldable material.

As an improvement of the foldable reflector, the end of the folding part of the reflector is provided with a buckle so that the blades of the reflector are located at the same curved surface after being bent.

As an improvement, the edge of the reflector is provided with a gap which is covered by the light reflecting thin film.

The connector may be a binding tape or an elastic tape with the end thereof being provided with a nylon hasp, a sticking surface, an elastic buckle and a quick release buckle, or a clamping installation structure or a quick release screw structure.

The pulling device may be a semitransparent soft light diffuser, the upper end of which is connected or sleeved with the reflector, two sides of which are both connected or sleeved with the reflector, and the lower end of which is connected with the connector to change the dimension of the soft light diffuser so that the reflector can be bent to various extents, therefore changing equivalent luminescent area, leading to diffuse reflection effect, and generating soft light.

As an improvement of the pulling device, the pulling device is a molding tape, one end of which is connected and/or sleeved with the upper part of the reflector, and the other end of which is connected with the connector; the reflector is bent to various extents by adjusting the length of the molding tape in order to change equivalent luminescent area and lead to diffuse reflection effect.

When step A is implemented, a connection angle adjusting device, which is used for adjusting a connection angle γ during the connection of the reflector with the luminescent lamp, is added between the root of the reflector and the luminescent lamp.

The connection angle adjusting device is a wedge-shaped cushion block; the connection angle γ between the reflector and the luminescent lamp is adjusted by adjusting the height and/or upper and lower edges of the wedge-shaped cushion block.

In order to implement the above method for generating diffuse reflection light, the present invention further designs a device, compatible with the method, for generating diffuse reflection light. The device comprises a luminescent lamp, and especially, a reflector reflecting the light of the luminescent lamp, a connector integrally connecting the reflector with the luminescent lamp and a pulling device enabling the reflector to be elastically bent forwards. The reflector may detachably be fixed on the luminescent lamp by means of the connector and used for reflecting the light of the luminescent lamp. One end of the pulling device may be connected or sleeved with the reflector and the other end may be connected with the connector to enable the reflector to be elastically bent forwards so that the reflector forms a curved surface.

The reflector may be round, elliptical or polygonal, and the natural state of the reflector may be a flat plate state.

The reflector may be a metal plate, a plastic plate or a fiber plate.

As an embodiment of the reflector, the reflector is a solid plate, the surface of which is rugged and granulated and also covered by light reflecting material as well as the backside of which is provided with reinforcing plates and/or reinforcing bars.

As another embodiment of the reflector, the reflector is a hollowed-out plate, light reflecting thin films are adhered to the surface of the reflector, and the reinforcing bars and/or the reinforcing plates are arranged at the unhallowed-out part of the reflector.

As a further improvement of the reflector, the reflector is foldable, with the folding parts being linked through a hinge or a flexible foldable material.

The end of the folding part of the reflector is provided with a buckle so that blades of the reflector are located at the same curved surface after being bent.

As an improvement, the edge of the reflector is provided with a gap which is covered by the light reflecting thin film.

The connector is a binding tape or an elastic tape with the end thereof being provided with a nylon hasp, a sticking surface, an elastic buckle and a quick release buckle, or a clamping installation structure or a quick release screw structure.

The pulling device may be a semitransparent soft light diffuser, the upper end of which is connected or sleeved with the reflector and two sides of which are both connected or sleeved with the reflector to change the dimension of the soft light diffuser so that the reflector can be bent to various extents, therefore changing equivalent luminescent area, leading to diffuse reflection effect, and generating soft light.

The circumference of the soft light diffuser is provided with an opened hollow positioning edging inside which a tensioning tape passes through; two ends of the tensioning tape are connected with each other at the opening of the hollow positioning edging, and the soft light diffuser can be tightly hooped on the reflector by adjusting the tensioning tape.

The tensioning tape may be an elastic tape, a fastening tape or a rope.

The soft light diffuser may further comprise a connecting adhesive buckle, which is adhesively fixed on the connector to fix the soft light diffuser; the connecting adhesive buckle is an adhesive buckle, a snap fastener, a hook buckle or a lace.

As an improvement of the pulling device, the pulling device is a molding tape, one end of which is connected and/or sleeved with the upper part of the reflector and the other end of which is connected with the connector; the reflector is bent to various extents by adjusting the length of the molding tape in order to change equivalent luminescent area and lead to diffuse reflection effect.

The molding tape comprises a positioning adhesive buckle, which is adhesively connected to the connector to fix the molding tape. The positioning adhesive buckle may be an adhesive buckle, a snap fastener, a hook buckle, or a lace.

The device for generating diffuse reflection light may further comprise an angle adjusting device, which is arranged between the root of the reflector and the luminescent lamp.

The angle adjusting device is a wedge-shaped cushion block; a connection angle γ between the reflector and the luminescent lamp is adjusted by adjusting the height and/or upper and lower edges of the wedge-shaped cushion block.

The wedge-shaped cushion block may be a rectangular block consisting of two blocks with trapezoidal section.

The connector further comprises a first fixing bracket, which is mounted on the connector and used for supporting the device for generating diffuse reflection light, or used as a mounting bracket.

As a further improvement of the fixing bracket, the connector further comprises a second fixing bracket, the connector connects the second fixing bracket with the luminescent lamp integrally and fixedly, and one end of the second fixing bracket is detachably fixed at the middle part of the reflector. In order to realize the fixation of the second fixing bracket, one end of the second fixing bracket is an L-shaped hook, which is embedded into the middle part of the reflector and is fixed therewith in a manner of clamped connection. The device further comprises a luminescent lamp gasket, which is arranged between the connector and the luminescent lamp. The device further comprises a positioning gasket, which is arranged between the connector and the reflector.

Compared with the prior art, the method of the present invention has the following advantages:

1. The structure in accordance with the present invention is simple, the installation and the disassembly are convenient. In comparison, the installation and the disassembly of light box, soft light box, soft light umbrella and light reflecting umbrella in the prior art are all troublesome; in particular, the installation of a soft light box is hard to be mastered; the outdoor use is also inconvenient. In accordance with embodiments of the present invention, the reflector is detachably fixed on the luminescent lamp by means of a connector and is then adjusted by means of a pulling device. Therefore, the structure in accordance with the present invention is quite simple, the installation and the disassembly are also quite convenient, and the indoor and outdoor uses are both extremely convenient.

2. The equivalent luminescent area can be adjusted. In comparison, after the light reflection, soft light devices in the prior art are installed, the equivalent luminescent area cannot be adjusted since the reflector does not change. However, in using a method or a device based on embodiments of the present invention, the equivalent luminescent area of the light reflection, soft light devices can be adjusted by adjusting the curved surface of the reflector in order to meet the requirements under different environments.

3. The device in accordance with the present invention has the advantages of a large soft light area, good effect, excellent lightness and convenient movement simultaneously. In comparison, the light reflection, soft light devices in the prior art are either quite large in soft light area but troublesome in installation and disassembly, or convenient in movement but too small in light reflection, soft light areas. However, in the method and the device in accordance with embodiments of the present invention, the reflector and the luminescent lamp are connected with each other movably and integrally by means of a simple connection device, resulting in good lightness and mobility. Meanwhile, the pulling device can also adjust the dimension of the curved surface of the reflector so that the feature of a large area of the soft light umbrella and the light reflecting umbrella is also taken into consideration.

DETAILED DESCRIPTION OF THE PREFERRED EMBODIMENTS

Further detailed description is made below with reference to the preferred embodiments shown in the drawings.

As shown in FIG. 1 to FIG. 37, the method in accordance with preferred embodiments of the present invention for generating diffuse reflection light is based on a luminescent lamp and comprises the following steps:

A. a reflector 10 is detachably fixed on the luminescent lamp 30 by means of a connector 20; and B. the reflector 10 is elastically bent forwards by means of a pulling device 40 in order to focus the diffuse reflection light.

Also, in step B, the reflector 10 is elastically bent forwards in a longitudinal direction or a transverse direction by means of the pulling device 40, in order to obtain the diffuse reflection light.

There are two ways to use the reflector 10.

In accordance with the first way, the reflector is a solid plate. When the reflector is the solid plate, the surface of the reflector is provided with plenty of rugged grains so that one surface of the reflector 10 for light reflection is rugged and granulated, and the surface of the reflector is also covered by light reflecting material in order to reinforce the effect of diffuse reflection. In order to strengthen the toughness of the reflector 10, the backside of the reflector is provided with reinforcing plates 82 and/or reinforcing bars 83.

In accordance with the second way, the reflector is a hollowed-out plate, aiming at reducing the weight of the reflector 10 effectively when a reflector with a large area is needed. When the hollowed-out reflector is used, light reflecting thin films 101 are adhered to the light reflecting surface of the reflector; in order to strengthen the toughness of the hollowed-out reflector, the reinforcing bars 83 and/or the reinforcing plates 82 are arranged at the unhallowed-out part of the backside of the reflector.

The reflector 10 may be designed to be foldable for purpose of convenient carrying. The reflector 10 can consist of at least two blades 11, with every two folding parts of the blades being linked with each other through a hinge or a flexible foldable material. In order to ensure that the blades 11 are located at the same curved surface when the foldable reflector 10 is bent, the end of the folding part of the reflector 10 is provided with a buckle 13.

The connector 20 according to an embodiment of the present invention is a binding tape or an elastic tape with the end thereof being provided with a nylon hasp, a sticking surface, an elastic buckle, a quick release buckle, a clamping installation structure, or a quick release screw structure.

There are two ways of using the pulling device 40.

In accordance with the first way, a semitransparent soft light diffuser 404 is adopted, the upper end of which is connected or sleeved with the reflector 10, two sides of which are both connected or sleeved with the reflector 10, the lower end of which is connected with the connector 20. When the dimension of the soft light diffuser 404 is changed, for example, when the soft light diffuser 404 is contracted transversely and/or longitudinally, then the reflector 10 may be bent to different extent, therefore changing equivalent luminescent area, leading to diffuse reflection effect, and generating soft light.

In accordance with the second way, a molding tape 405 is adopted. There are three proposals for the installation and use of the molding tape 405, one end of the molding tape is connected and/or sleeved with the upper part of the reflector 10 and the other end is connected with the connector 20. The reflector (10) may be bent to various extents by adjusting the length of the molding tape 405, therefore changing equivalent luminescent area and leading to diffuse reflection effect. When the soft light diffuser 404 or the molding tape 405 is hooped on the outer edge of the reflector 10, a gap which is covered by the light reflecting thin films 101 can be arranged at the edge of the reflector 10 in order to enable the bending of the reflector 10 and form an inward curved surface more easily.

During practical application, the reflector 10 sometimes needs to change the primary irradiation direction of diffuse reflection light. In order to achieve such a change, when the step A is implemented, a connection angle adjusting device 90, which is used for adjusting a connection angle γ during the connection of the reflector 10 with the luminescent lamp 30, is added between the root of the reflector 10 and the luminescent lamp 30. In this case, the reflector 10 can change the primary irradiation direction of light. During practical application, the connection angle adjusting device 90 is a wedge-shaped cushion block which consists of two blocks with trapezoidal section and identical dimension and which is shaped as a rectangular block, the connection angle γ between the reflector 10 and the luminescent lamp 30 can be adjusted by adjusting the height M and/or upper edge L and lower edge N of the rectangular block. During practical application, blocks with different dimensions can be made as required to accomplish replacement.

A device for generating diffuse reflection light, which is designed according to the present invention, may comprise a plurality of embodiments based on different reflector 10, connector 20 and pulling device 40. A detailed description is made below with reference to FIG. 1 to FIG. 32.

Figure 21:
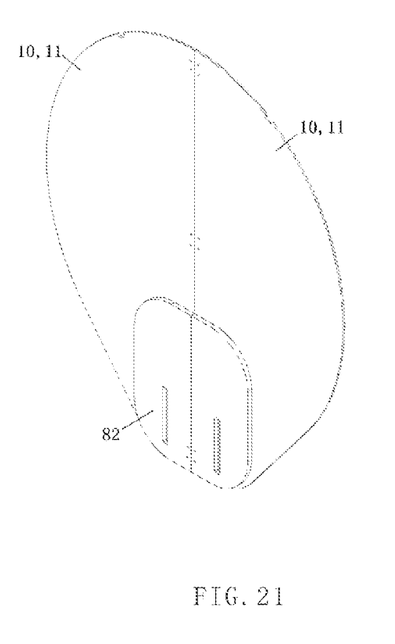
FIG. 21 is an axonometric projection schematic diagram of the solid reflector (provided with reinforcing plates) of the molding device for generating diffuse reflection light.
Figure 22:
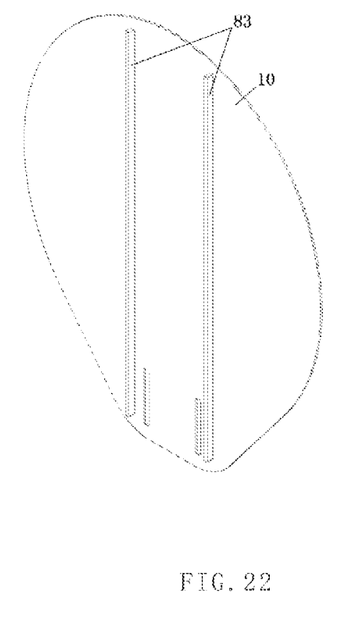
FIG. 22 is an axonometric projection schematic diagram of the solid reflector (provided with reinforcing rib) of the molding device for generating diffuse reflection light.
Figure 23:
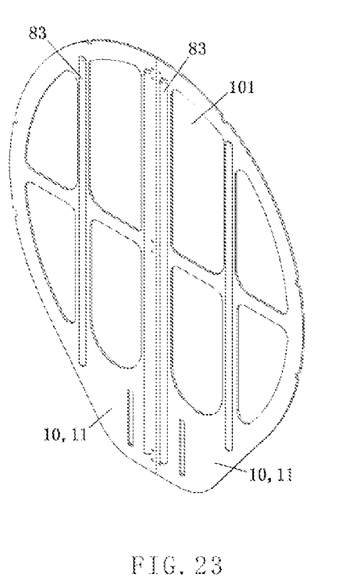
FIG. 23 is an axonometric projection schematic diagram of the hollowed-out reflector (provided with reinforcing rib) of the molding device for generating diffuse reflection light.
Figure 24:
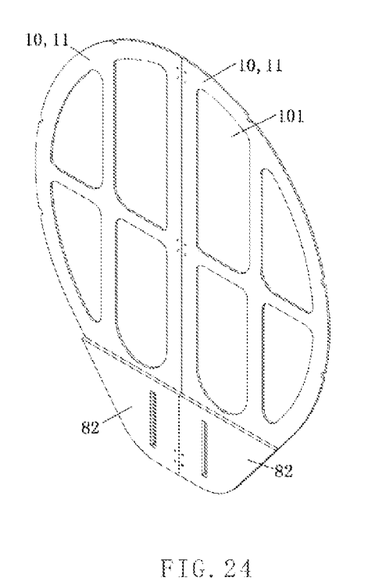
FIG. 24 is an axonometric projection schematic diagram of the hollowed-out reflector (provided with reinforcing plates) of the molding device for generating diffuse reflection light.

A device for generating diffuse reflection light according to an embodiment of the present invention comprises a luminescent lamp 30, a reflector 10 reflecting the light of the luminescent lamp 30, a connector integrally connecting the reflector 10 with the luminescent lamp 30 and a pulling device 40 enabling the reflector 10 to be elastically bent forwards, and further comprises a first fixing bracket 201 for supporting the entire diffuse reflection light generating device or being used as a mounting bracket. The reflector 10 is a solid plate or a hollowed-out plate and is round, elliptical or polygonal in shape, preferably elliptical and polygonal. The reflector 10 is an elastic plate made of metal plate, plastic plate or fiber plate, preferably metal plate. As shown in FIG. 21 and FIG. 22, the reflector 10 is the solid plate. In order to strengthen the toughness of the reflector 10, the backside of the reflector is provided with reinforcing plates 82 and/or reinforcing bars 83; light reflecting material is coated on the light reflecting surface of the reflector 10 to form a diffuse reflection surface, and in order to further strengthen the diffuse reflection effect, the light reflecting surface is provided with rugged grains so that the light reflecting surface of the reflector 10 is rugged. As shown in FIGS. 18, 19, 23, and 24, the reflector 10 is the hollowed-out plate, in order to strengthen the elasticity and the toughness of the reflector 10, the reinforcing bars 83 and/or the reinforcing plates 82 are arranged at the unhallowed-out part of the backside of the reflector; and in order to solve the problem that a light reflecting layer is difficult to be arranged on the surface of the hollowed-out reflector, light reflecting thin films 101 or light reflecting thin films 101 with rugged grains on the surface thereof can be adhered to the surface of the reflector 10.

In the diffuse reflection light generating device according to the present invention, the reflector 10 is preferably the hollowed-out plate, which reduces the weight of the reflector 10 and lightens the device of the present invention. For facilitating convenient carrying, the reflector 10 can become more convenient in a foldable type as shown in FIG. 18-20, FIG. 23, and FIG. 24, the number of folds of the foldable plate can be based on actual application, the foldable plate at least comprises two blades 11, preferably two blades with the folding part thereof being linked through a hinge or a flexible foldable material.

Figure 28:
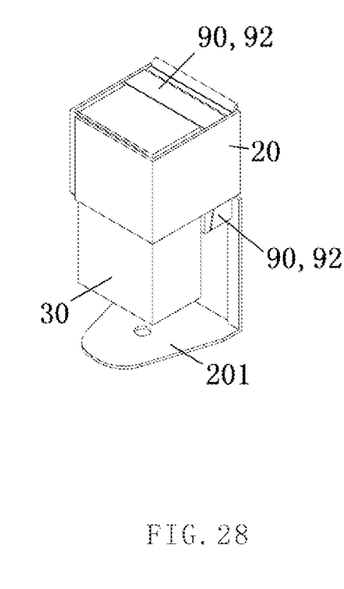
FIG. 28 is a local axonometric projection schematic diagram of the first fixing bracket and the connector of the molding device for generating diffuse reflection light.
Figure 29:
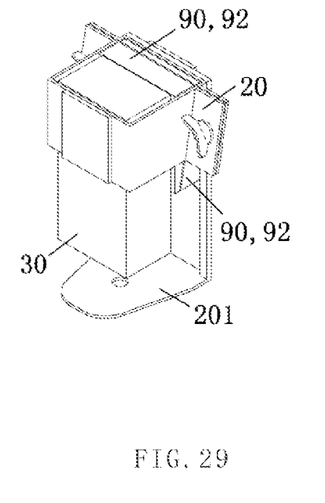
FIG. 29 is a local axonometric projection schematic diagram of the first fixing bracket and the connector (using quick release screw for fixation) of the molding device for generating diffuse reflection light.

The connector 20 is a device integrally connecting the luminescent lamp 30 with the reflector 10, which is a binding tape or an elastic tape with the end thereof being provided with a nylon hasp, a sticking surface, an elastic buckle, a quick release buckle, a clamping installation structure, or a quick release screw structure. As shown in FIG. 28, the connector 20 is a binding tape with the end thereof being provided with the sticking surface. A connector adopting a quick release screw structure is shown in FIG. 29.

The pulling device may be realized by adopting the soft light diffuser 404 or the molding tape 405.

Figure 25:
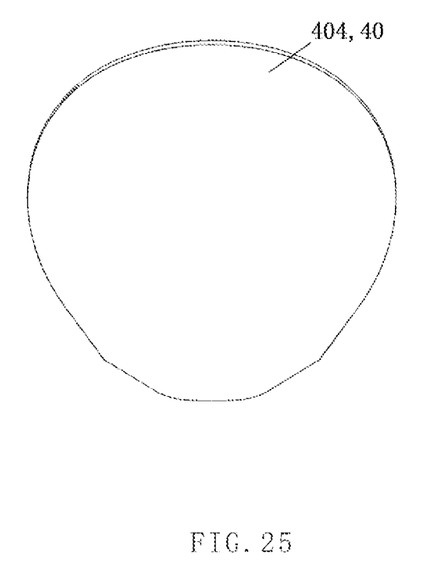
FIG. 25 is a front view of the soft light diffuser of the molding device for generating diffuse reflection light.
Figure 26:
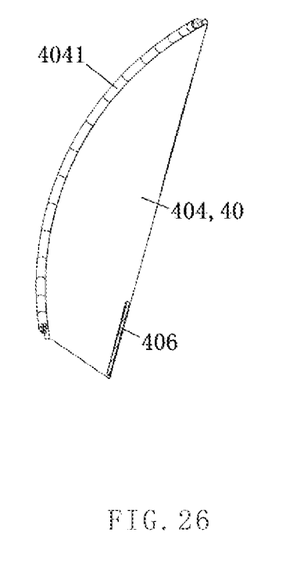
FIG. 26 is a left view of the soft light diffuser of the molding device for generating diffuse reflection light.
Figure 27:
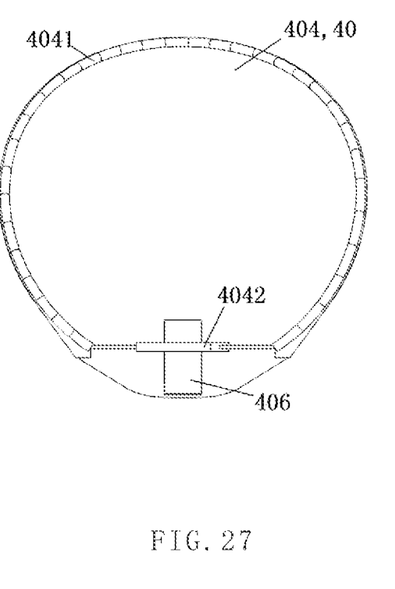
FIG. 27 is a rear view of the soft light diffuser of the molding device for generating diffuse reflection light.

A soft light diffuser for a device in accordance with the present invention is shown in FIG. 25 to 27. The circumference of the soft light diffuser 404 is provided with an opened hollow positioning edging 4041 inside which a tensioning tape 4042 passes through; two ends of the tensioning tape 4042 are connected with each other at the opening of the hollow positioning edging 4041; and the tensioning tape 4042 is an elastic tape, a fastening tape or a rope, preferably the elastic tape.

Figure 1:
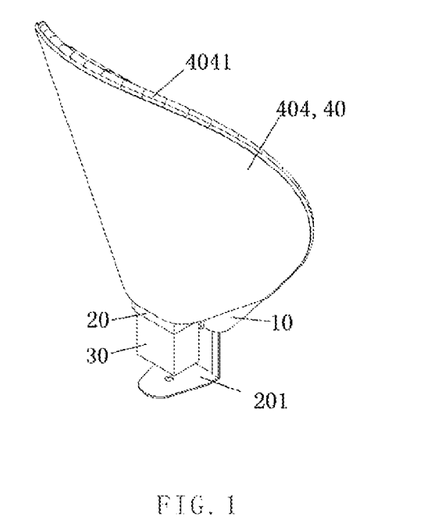
FIG. 1 is an axonometric projection schematic diagram of the molding device (using soft light diffuser, longitudinal pulling) for generating diffuse reflection light according to an embodiment of the invention.
Figure 2:
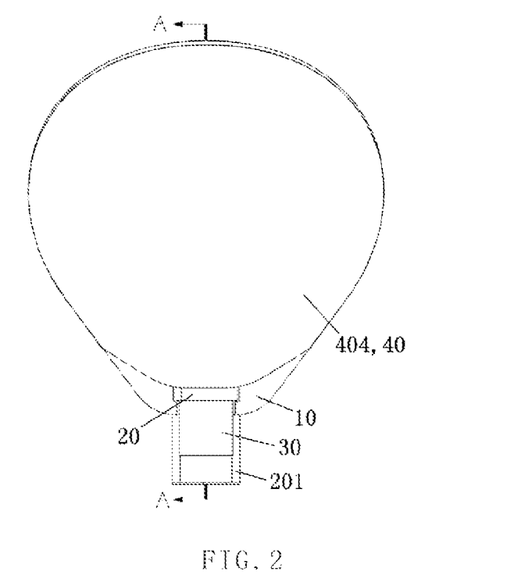
FIG. 2 is a front view of the molding device (using soft light diffuser, longitudinal pulling) for generating diffuse reflection light.
Figure 3:
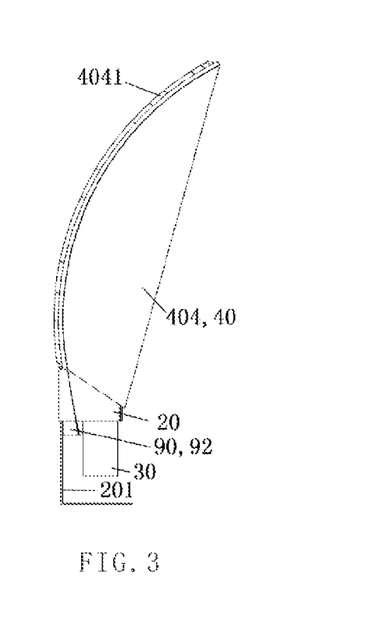
FIG. 3 is a left view of the molding device (using soft light diffuser, longitudinal pulling) for generating diffuse reflection light.
Figure 4:
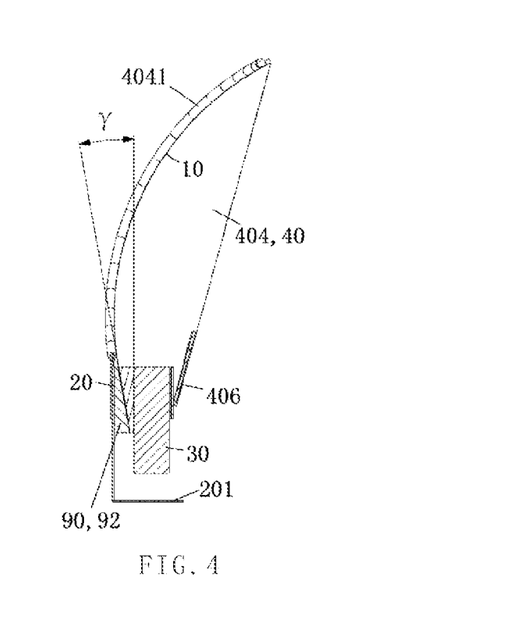
FIG. 4 is a cutaway view of FIG. 2 along the line A-A.
Figure 5:
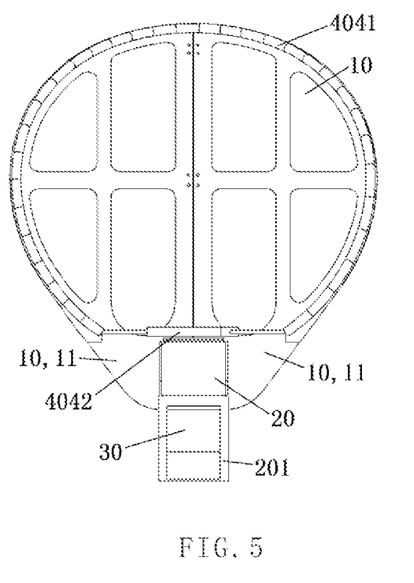
FIG. 5 is a rear view of the molding device (using soft light diffuser, longitudinal pulling) for generating diffuse reflection light.
Figure 6:
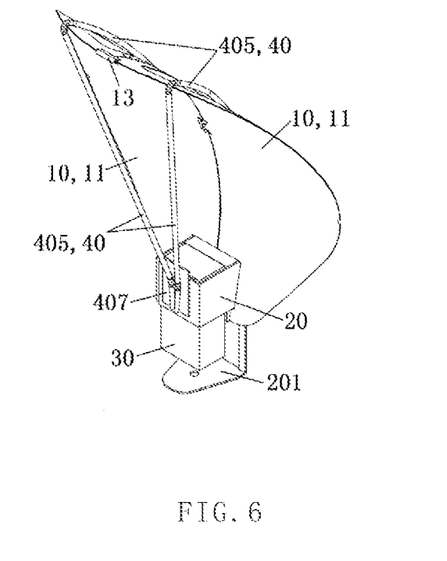
FIG. 6 is an axonometric projection schematic diagram of the molding device (using molding tape longitudinally) for generating diffuse reflection light.
Figure 7:
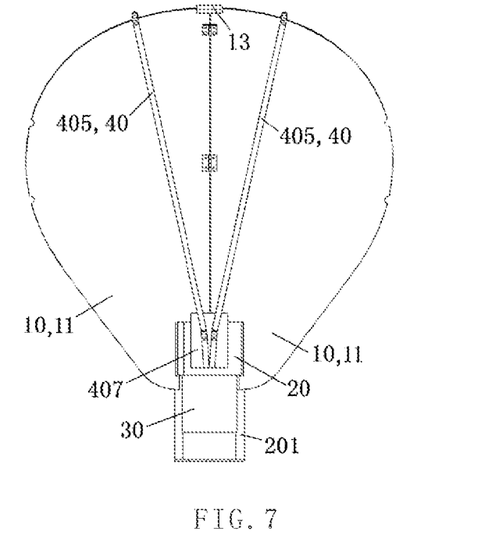
FIG. 7 is a front view of the molding device (using molding tape longitudinally) for generating diffuse reflection light.
Figure 8:
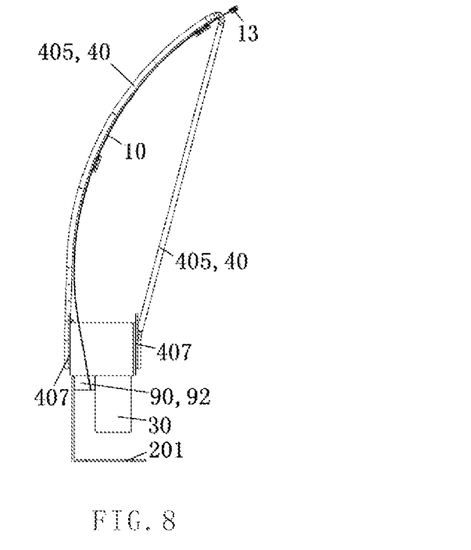
FIG. 8 is a left view of the molding device (using molding tape longitudinally) for generating diffuse reflection light.
Figure 9:
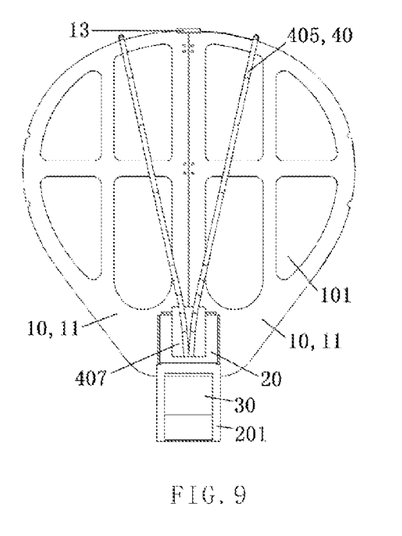
FIG. 9 is a rear view of the molding device (using molding tape longitudinally) for generating diffuse reflection light.
Figure 10:
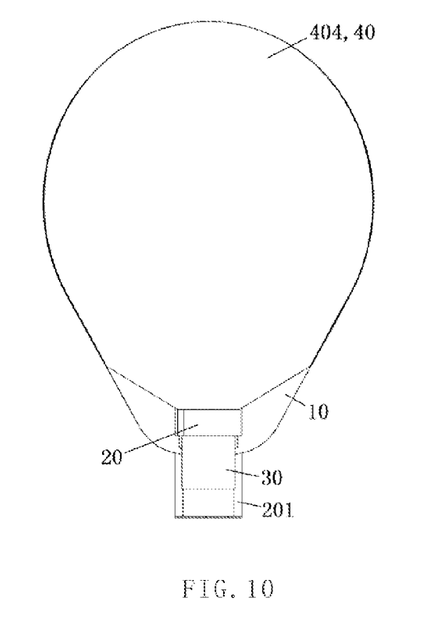
FIG. 10 is a front view of the molding device (using soft light diffuser and elliptical reflector, transverse pulling) for generating diffuse reflection light.
Figure 11:
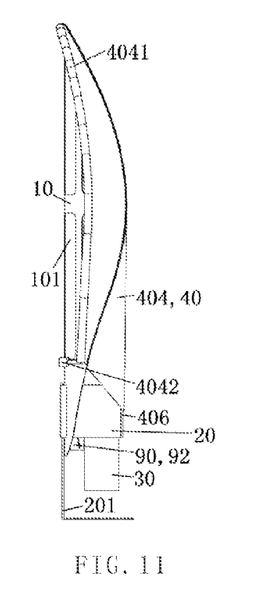
FIG. 11 is a left view of the molding device (using soft light diffuser and elliptical reflector, transverse pulling) for generating diffuse reflection light.
Figure 12:
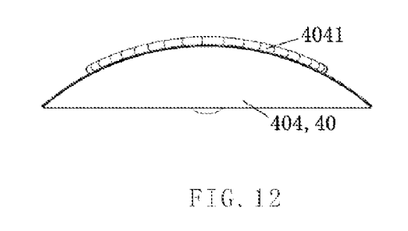
FIG. 12 is a top view of the molding device (using soft light diffuser and elliptical reflector, transverse pulling) for generating diffuse reflection light.
Figure 13:
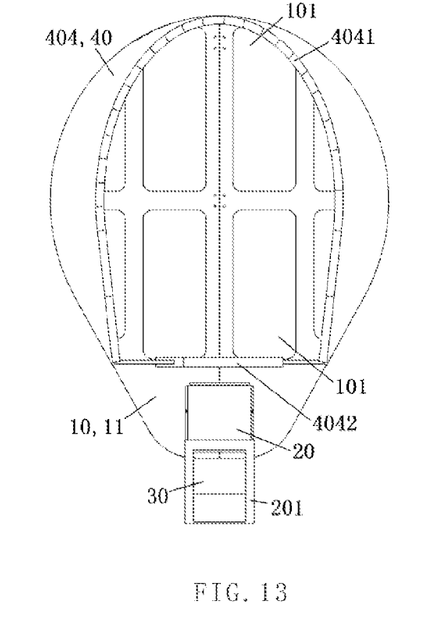
FIG. 13 is a rear view of the molding device (using soft light diffuser and elliptical reflector, transverse pulling) for generating diffuse reflection light.
Figure 14:
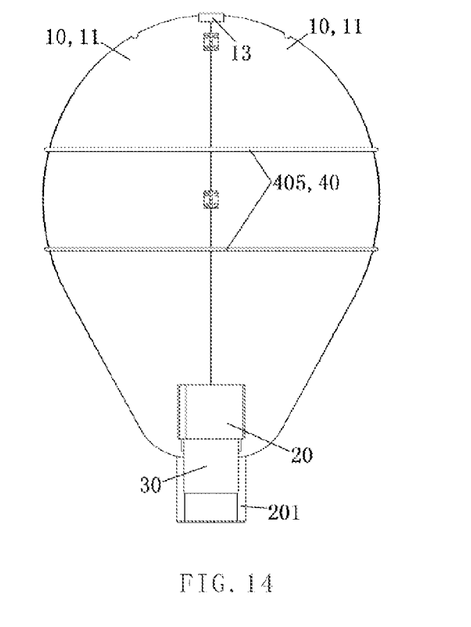
FIG. 14 is a front view of the molding device (using molding tape transversely) for generating diffuse reflection light.
Figure 15:
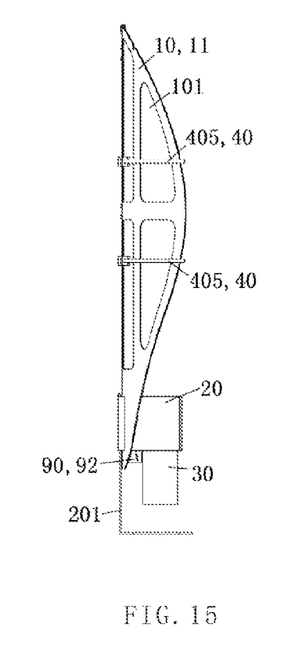
FIG. 15 is a left view of the molding device (using molding tape transversely) for generating diffuse reflection light.
Figure 16:
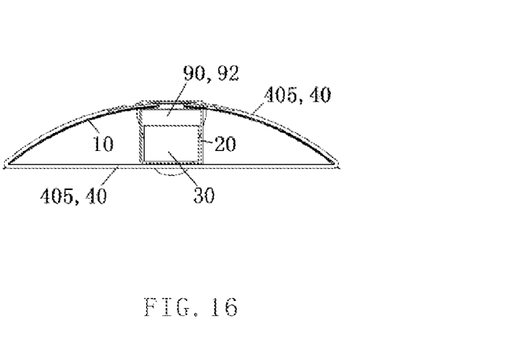
FIG. 16 is a top view of the molding device (using molding tape transversely) for generating diffuse reflection light.
Figure 17:
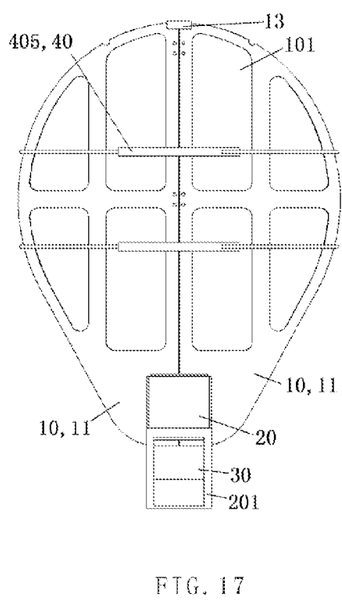
FIG. 17 is a rear view of the molding device (using molding tape transversely) for generating diffuse reflection light.
Figure 18:
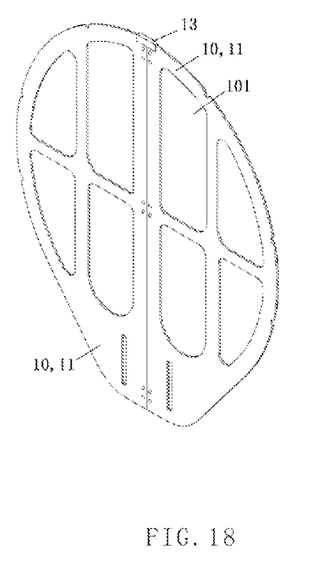
FIG. 18 is an axonometric projection schematic diagram of the hollowed-out reflector of the molding device for generating diffuse reflection light.
Figure 19:
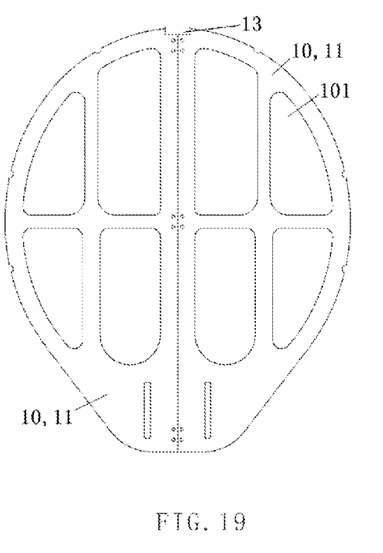
FIG. 19 is a front view of the hollowed-out reflector of the molding device for generating diffuse reflection light.
Figure 20:
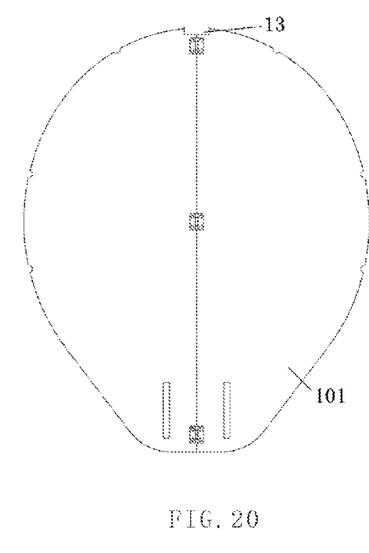
FIG. 20 is a rear view of the hollowed-out reflector of the molding device for generating diffuse reflection light.
Figure 30:
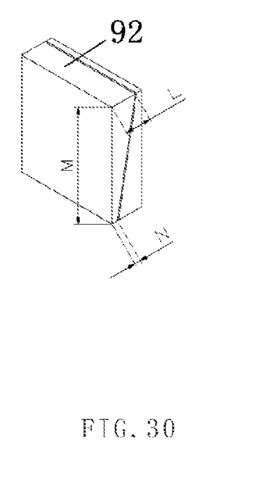
FIG. 30 is an axonometric projection schematic diagram of the connection angle adjusting device (wedge-shaped cushion block) of the molding device for generating diffuse reflection light.

FIGS. 1-5 show the first preferred embodiment of a diffuse reflection light generating device according to the present invention, which comprises the hollowed-out reflector 10, the semitransparent soft light diffuser 404, the connector 20 in the form of the binding tape with the end thereof being provided with the sticking surface, the connection angle adjusting device 90 with the wedge-shaped cushion block 92 as the rectangular block and the first fixing bracket 201. The wedge-shaped cushion block 92 is arranged between the root of the reflector 10 and the luminescent lamp 30 and is the rectangular block consisting of two blocks with trapezoidal section, the stereoscopic diagram thereof is shown in FIG. 30. The binding tap serving as the connector 20 passes through two slots (specifically schematic as FIG. 18 to 24, or in the form of two holes according to actual application situation) at the bottom of the reflector 10 and then tightly binds the root of the reflector 10 with the luminescent lamp 30 and the first fixing bracket 201. The upper end of the soft light diffuser 404 serving as the pulling device is connected or sleeved to the reflector 10, and the two sides thereof are also connected or sleeved to the reflector 10. In this embodiment, the soft light diffuser 404 covers the reflector 10 in a sleeved manner. The tensioning tape passing through the opened hollow positioning edging 4041 at the circumference is connected at the opening. The reflector 10 can be elastically bent forwards to form a curved surface by adjusting the tensioning degree of the tensioning tape 4042, and the equivalent luminescent area can be changed when the reflector 10 is bent to different extent. The soft light diffuser 404 further comprises a connecting adhesive buckle 406, which is positioned at the lower part of the soft light diffuser 404 and which is adhesively fixed on the connector 20 to fix the lower part of the soft light diffuser 404 and pull the reflector 10. Because the connecting adhesive buckle 406 is a movable adhesive buckle, the degree of bending of the curved surface of the reflector 10 can also be adjusted by adhering the connecting adhesive buckle 406 to the vertical position on the connector 20. The connecting adhesive buckle 406 may be an adhesive buckle, a snap fastener, a hook buckle or a lace. In the first preferred embodiment of the present invention, the reflector 10 is a foldable hollowed-out reflector. To ensure that the blades 11 are located at the same curved surface when the bent reflector is bent, the end of the folding part of the reflector 10 can also be provided with a buckle 13, which is shown in FIG. 18 to 20. As shown in FIG. 30, the wedge-shaped cushion block 92 is replaceable, the connection angle γ (shown in FIG. 4) between the reflector 10 and the luminescent lamp 30 can be adjusted only by the replacement of the trapezoidal block with different upper edge L, lower edge N and height M.

What is shown in FIGS. 6 to 9 is the second preferred embodiment of a diffuse reflection light generating device according to the present invention, which comprises the hollowed-out reflector 10, the molding tape 405, the connector 20 in the form of the binding tape with the end thereof being provided with the sticking surface, the connection angle adjusting device 90 with the wedge-shaped cushion block 92 similarly as the rectangular block and the first fixing bracket 201. The connection way between the reflector 10 and the connector 20, the first fixing bracket 201 and the adjustment way of the connection angle adjusting device 90 are the same as those in the first embodiment; the difference lies in the way of using the pulling device 40, which is to longitudinally bend the reflector 10. Two ends of the molding tape 405 are respectively adhesively fixed on two opposite sides of the connector 20, and the middle part thereof is sleeved on the upper part of the reflector 10. In order to prevent the molding tape 405 sleeved on the upper part of the reflector 10 from sliding, two grooves are arranged at two sides of the upper part of the reflector 10 to clamp the molding tape 406. Just as the connecting adhesive buckle 406 arranged at the lower part of the soft light diffuser 404 in the first embodiment, two ends of the molding tape 405 comprise positioning adhesive buckles 407 which are adhesively connected to the connector 20 in order to fix the molding tape 405. The degree of bending the reflector 10 can be adjusted by adjusting the vertical position of the positioning adhesive buckles 407 on the connector 20. The equivalent luminescent area can be changed when the reflector 10 is bent to different extent. Furthermore, the degree of bending the reflector 10 can also be adjusted by adopting a molding tape with a different length. The positioning adhesive buckle 407 is an adhesive buckle, a snap fastener, a hook buckle, or a lace. FIGS. 14 to 17 show another embodiment in which the molding tape is used as the pulling device. The reflector 10 is transversely bent. The molding tape 405 is transversely hooped in the middle position of the reflector 10. The reflector 10 can be bent transversely by adjusting the length of the molding tape 405. Similarly, the equivalent luminescent area can also be changed.

FIGS. 10 to 13 show the soft light diffuser 404 as the pulling device. The reflector 10 is elliptical hollowed-out reflector, and pulled by the pulling device, and two sides of the elliptical reflector are bent forwards to form a curved surface.

Figure 31:
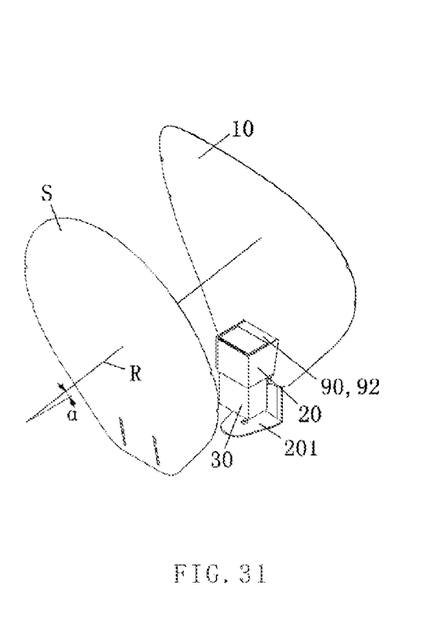
FIG. 31 and FIG. 32 are schematic diagrams showing the change of the equivalent luminescent area S before and after the change of the bending extent of the reflector of the molding device for generating diffuse reflection light.
Figure 32:
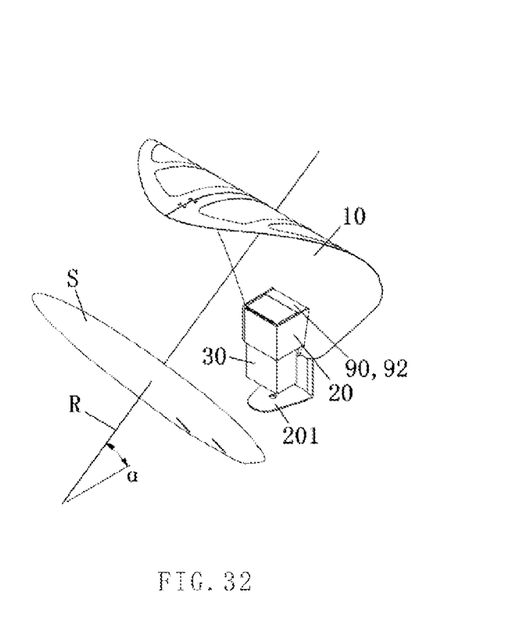
Figure 33:
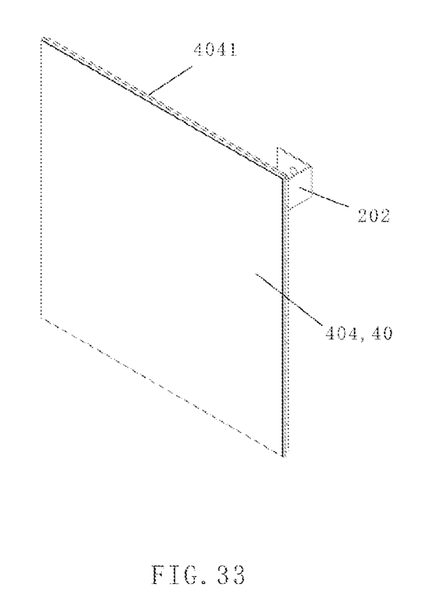
FIG. 33 and FIG. 34 are axonometric projection schematic diagrams of two different angles of the molding device for generating diffuse reflection light (the embodiment in which the second fixing bracket is fixed in the middle part of the reflector, the reflector is rectangular, and the soft light diffuser is used as the pulling device)
Figure 34:
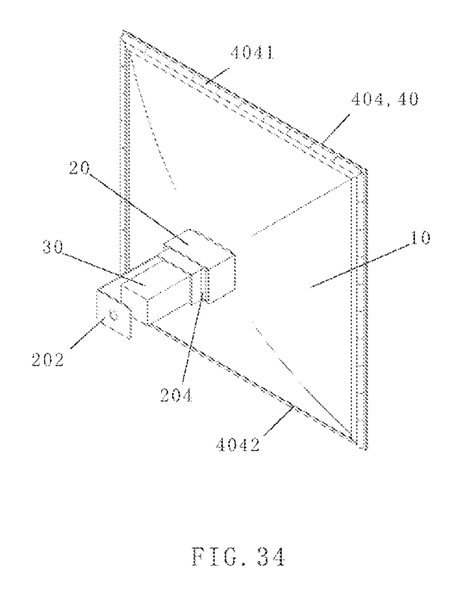
Figure 35:
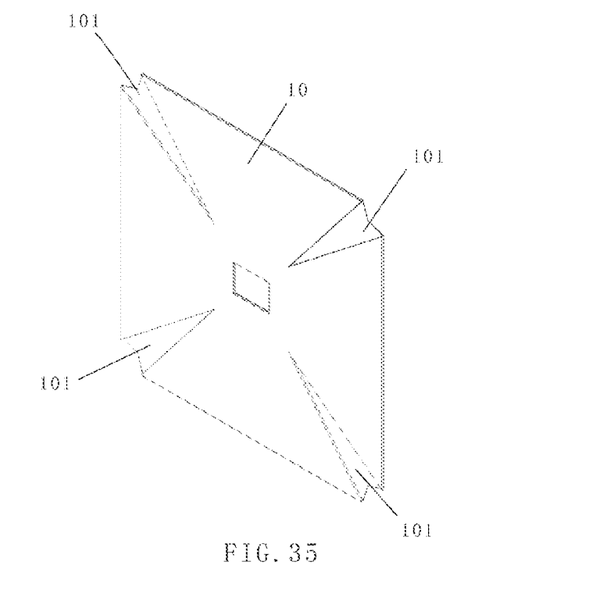
FIG. 35 is an axonometric projection schematic diagram of the reflector in the molding device shown as FIG. 33 and FIG. 34.
Figure 36:
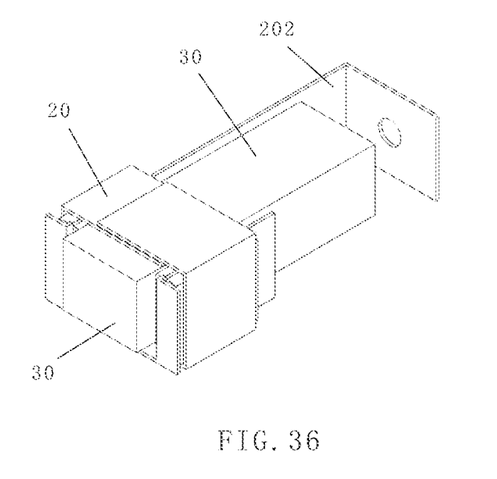
FIG. 36 is a local axonometric projection schematic diagram of the second fixing bracket and the connector of the molding device for generating diffuse reflection light.
Figure 37:
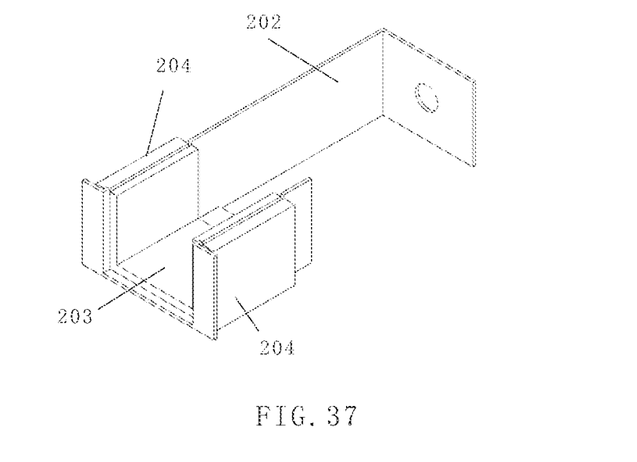
FIG. 37 is an axonometric projection schematic diagram of the second fixing bracket of the molding device for generating diffuse reflection light.

In order to explain change of equivalent luminescent area of a device of the present invention, as shown in FIGS. 31 and 32, R represents a central normal of the reflector 10, S represents an orthographic projection area of the reflector 10, namely the equivalent luminescent area of a device in accordance with the present invention, and angle α represents an included angle between the central normal R and the ground or the luminescent plane of a light source. The angle α is changed by adjusting the soft light diffuser 404. When the angle α in FIG. 31 is enlarged to the angle α in FIG. 32, the bending surface of the reflector 10 is changed to different extent, which not only adjusts the primary irradiation direction of the diffuse reflection light of the reflector 10, but also changes the equivalent luminescent area S of the device in accordance with the present invention. This is an effect the light box, the light reflection and soft light device in the prior art cannot achieve.

Similarly, when the molding tape 405 is used as the pulling device, the angle α can be changed just like the use of soft light diffuser 404 for adjusting the degree of bending of the reflector 10, which not only adjusts the primary irradiation direction of the diffuse reflection light of the reflector 10, but also adjusts the equivalent luminescent area S. That is to say, the device of the present invention can adjust the equivalent luminescent area in order to adapt to the use under different circumstances.

What is shown in FIG. 33 to 37 is a diffuse reflection light generating device fixed by a fixing bracket in accordance with another preferred embodiment of the present invention. The difference of this embodiment from the above preferred embodiment lies in the fact that, the fixing bracket is the second fixing bracket 202, the connector 20 connects the second fixing bracket 202 with the luminescent lamp 30 integrally and fixedly, one end of the second fixing bracket 202 being an L-shaped hook which is embedded into the middle part of the reflector 20 and fixed therewith in a manner of clamped connection. The second fixing bracket is detachably fixed in the middle part of the reflector 10. The edge of the reflector 10 is provided with a gap covered by a light reflecting thin film. A luminescent lamp gasket 203 is arranged between the connector 20 and the luminescent lamp 30; and a positioning gasket 204 is arranged between the connector 20 and the reflector 10. In this embodiment, the pulling device can be realized by adopting the soft light diffuser 404 hooped on the outer edge of the reflector 10 (or can be realized by adopting the molding tape 405 hooped on the outer edge of the reflector 10). The change of bending of the reflector 10 is realized by the tensioning tape at the edge of the soft light diffuser 404 (or adjusting the length of the molding tape 405), and the specific embodiment is the same as the aforementioned preferred embodiment. No connection angle adjusting device is designed in this embodiment. The change of the degree of bending of the reflector 10 is accomplished by the contraction of the soft light diffuser 404 or the replacement of the soft light diffuser with different dimension (or by adjusting the length of the molding tape 405).

The above preferred embodiments are presented to further illustrate the invention but should not be construed as in any way to limit its scope. Some simple omissions or substitutions can be made by a person of ordinary skill in this art to which the present invention pertains without departing from the concept of the present invention and shall be considered to be within the scope of protection of the present invention.

The invention claimed is:

1. A method for generating diffuse reflection light, which is based on a luminescent lamp, comprising the following steps:
   A. detachably fixing a reflector on the luminescent lamp by means of a connector; and
   B. elastically bending the reflector forwards by means of a pulling device in order to focus the diffuse reflection light, wherein one end of the pulling device is connected or sleeved with the reflector, and another end of the pulling device is connected with the connector,
   wherein the reflector is an elastic plate made of metal, or fiber, and reinforcing members arranged on a backside of the reflector,
   wherein the pulling device is a semitransparent soft light diffuser covering the reflector, having an upper end of which is connected or sleeved with the reflector, two sides of which are both connected or sleeved with the reflector, and a lower end of the pulling device is connected with the connector,
   the dimension of the soft light diffuser being changed when the soft light diffuser is contracted, causing the reflector to bent to a different extent;
   the soft light diffuser further comprises a connecting adhesive buckle, which is positioned at the lower end of the soft light diffuser and adhesively fixed on the connector to fix the lower part of the diffuser and pull the reflector,
   wherein the reflector is bent to various extents by adjusting a vertical connecting position of the connector and connecting adhesive buckle, therefore leading to a diffuse reflection effect, and generating soft light.

2. The method according to claim 1 wherein:
the reflector is a solid plate.

3. The method according to claim 2 wherein:
a surface of the reflector is covered by light reflecting material.

4. The method according to claim 1, wherein:
the reflector is a hollowed-out plate.

5. The method according to claim 4, wherein:
light reflecting thin films are adhered to a surface of the reflector.

6. The method according to claim 5, wherein:
the reinforcing bars and/or the reinforcing plates are arranged at an unhallowed-out part of the reflector.

7. The method according to claim 1, wherein:
the reflector is foldable, with every two folding parts of blades thereof being linked with each other through a hinge or a flexible foldable material.

8. The method according to claim 7, wherein:
an end of the folding part of the reflector is provided with a buckle so that the blades of the reflector are located at the same curved surface after being bent.

9. The method according to claim 1, wherein:
an edge of the reflector is provided with a gap which is covered by light reflecting thin films.

10. The method according to claim 1, wherein:
the connector is a binding tape or an elastic tape whose end is provided with a nylon hasp, a sticking surface, an elastic buckle and a quick release buckle, or a clamping installation structure or a quick release screw structure.

11. The method according to claim 1, wherein:
the pulling device is a molding tape, one end of which is connected and/or sleeved with an upper part of the reflector and the other end of which is connected with the connector, therefore leading to diffuse reflection effect.

12. The device according to claim 11, wherein:
the reflector can be bent to various extents by adjusting a length of the molding tape or a vertical connection position with the connector, therefore changing equivalent luminescent area.

13. The method according to claim 1, wherein:
after step A is implemented, a connection angle adjusting device, which is used for adjusting a connection angle γ during the connection of the reflector with the luminescent lamp, is added between a root of the reflector and the luminescent lamp.

14. The method according to claim 13, wherein:
the connection angle adjusting device is a wedge-shaped cushion block; the connection angle γ between the reflector and the luminescent lamp is adjusted by adjusting a height and/or upper and lower edges of the wedge-shaped cushion block.

15. A device for generating diffuse reflection light, comprising a luminescent lamp, wherein:
   the device further comprises a reflector reflecting the light of the luminescent lamp,
   a connector integrally connecting the reflector with the luminescent lamp and a pulling device enabling the reflector to be elastically bent forwards;
   the reflector is detachably fixed on the luminescent lamp by means of the connector and used for reflecting the light of the luminescent lamp;
   one end of the pulling device is connected or sleeved with the reflector and another end is connected with the connector, to be elastically bent forwards, thus the reflector forms a curved surface,
   wherein the reflector is an elastic plate made of metal or fiber, and reinforcing members arranged on a backside of the reflector,
   wherein the pulling device is a semitransparent soft light diffuser covering the reflector, having an upper end of which is connected or sleeved with the reflector, two sides of which are both connected or sleeved with the reflector, and a lower end of the pulling device is connected with the connector,
   a dimension of the soft light diffuser being changed when the soft light diffuser is contracted, causing the reflector to bent to a different extent;
   the soft light diffuser further comprises a connecting adhesive buckle, which is positioned at the lower end of the soft light diffuser and adhesively fixed on the connector to fix the lower part of the diffuser and pull the reflector,
   wherein the reflector is bent to various extents by adjusting the vertical connecting position of the connector and connecting adhesive buckle, therefore leading to a diffuse reflection effect, and generating soft light.

16. The device light according to claim 15, wherein:
the reflector is round, elliptical or polygonal.

17. The device according to claim 16, wherein:
the reflector is a metal plate, a plastic plate or a fiber plate.

18. The device according to claim 16, wherein:
the reflector is a solid plate.

19. The device according to claim 16, wherein:
the reflector is a hollowed-out plate.

20. The device according to claim 19, wherein:
light reflecting thin films are adhered to a surface of the reflector.

21. The device according to claim 20, wherein:
the reinforcing bars and/or the reinforcing plates are arranged at an unhallowed-out part of the reflector.

22. The device according to claim 15, wherein:
a surface of the reflector is covered by a light reflecting material.

23. The device according to claim 15, wherein:
the reflector is foldable, with folding parts being linked through a hinge or a flexible foldable material.

24. The device according to claim 23, wherein:
an end of the folding part of the reflector is provided with a buckle so that blades of the reflector are located at the same curved surface after being bent.

25. The device according to claim 15, wherein:
an edge of the reflector is provided with a gap which is covered by light reflecting thin films.

26. The device according to claim 15, wherein:
the connector is a binding tape or an elastic tape whose end is provided with a nylon hasp, a sticking surface, an elastic buckle and a quick release buckle, or a clamping installation structure or a quick release screw structure.

27. The device according to claim 15, wherein:
a circumference of the soft light diffuser is provided with an opened hollow positioning edging inside which a tensioning tape passes through; two ends of the tensioning tape are connected with each other at an opening of the hollow positioning edging, and the soft light diffuser can be tightly hooped on the reflector by adjusting the tensioning tape.

28. The device according to claim 27, wherein:
the tensioning tape is an elastic tape, a fastening tape or a rope.

29. The device according to claim 15, wherein:
the connecting adhesive buckle is an adhesive buckle, a snap fastener, a hook buckle or a lace.

30. The device according to claim 15, wherein:
the pulling device is a molding tape, one end of which is connected and/or sleeved with an upper part of the reflector and the other end of which is connected with the connector, and leading to diffuse reflection effect.

31. The device according to claim 30, wherein:
the molding tape comprises a positioning adhesive buckle, which is adhesively connected to the connector to fix the molding tape.

32. The device according to claim 30, wherein:
the reflector can be bent to various extents by adjusting a length of the molding tape or a vertical connection position with the connector, therefore changing equivalent luminescent area and a primary direction light radiation.

33. The device according to claim 31, wherein:
the positioning adhesive buckle is an adhesive buckle, a snap fastener, a hook buckle or a lace.

34. The device according to claim 15, wherein:
the device further comprises an angle adjusting device, which is arranged between a root.

35. The device according to claim 34, wherein:
the angle adjusting device is a wedge-shaped cushion block; a connection angle $\gamma$ between the reflector and the luminescent lamp is adjusted by adjusting a height and/or upper and lower edges of the wedge-shaped cushion block.

36. The device according to claim 35, wherein:
the wedge-shaped cushion block is a rectangular block consisting of two blocks with trapezoidal section.

37. The device according to claim 15, wherein:
the connector further comprises a first fixing bracket, which is mounted on the connector and used for supporting the molding device for generating diffuse reflection light, or used as a mounting bracket.

38. The device according to claim 15, wherein:
the connector further comprises a second fixing bracket, the connector connects the second fixing bracket with the luminescent lamp integrally and fixedly, and one end of the second fixing bracket is detachably fixed at a middle part of the reflector.

39. The device according to claim 38, wherein:
one end of the second fixing bracket is an L-shaped hook, which is embedded into the middle part of the reflector, and is fixed therewith in a manner of clamped connection.

* * * * *